United States Patent [19]
Furlani et al.

[11] Patent Number: 5,848,684
[45] Date of Patent: Dec. 15, 1998

[54] METHOD FOR TRANSPORTING MAGNETIC OBJECTS

[75] Inventors: Edward P. Furlani, Lancaster; Syamal K. Ghosh; Dilip K. Chatterjee, both of Rochester, all of N.Y.

[73] Assignee: Eastman Kodak Company, Rochester, N.Y.

[21] Appl. No.: 901,186

[22] Filed: Jul. 28, 1997

[51] Int. Cl.[6] ............................. B65G 15/58; B01D 35/06
[52] U.S. Cl. ..................... 198/805; 198/690.1; 210/695; 210/222; 210/223; 492/49; 492/53; 492/56
[58] Field of Search ............................. 198/690.1, 805; 210/692, 222, 223; 492/49, 53, 56

[56] References Cited

U.S. PATENT DOCUMENTS 3,437,074  4/1969  Hagopian et al. .................. 198/690.1
3,646,651  3/1972  McGaughey et al. ..................... 492/53
4,544,060  10/1985  Enomoto .............................. 198/690.1

*Primary Examiner*—William E. Terrell
*Assistant Examiner*—Mark Deuble

[57] ABSTRACT

A magnetic transport system (8) has at least one magnetic transport roller (20) mounted to a frame (10) for conveying a ferromagnetic web (12). The transport roller (20) has a magnetic core (22), a first bonding layer (24) at least partially surrounding and bonded to the core (22), a first layer (26) at least partially surrounding and bonded to the first bonding layer (24), a second bonding layer 28 for bonding second layer 30 to the core (20). Second layer (30) comprises a wear and abrasion resistant material. Further, a ferromagnetic web (12) is arranged for movement along the magnetic transport roller (20) for transporting materials thereon.

5 Claims, 3 Drawing Sheets

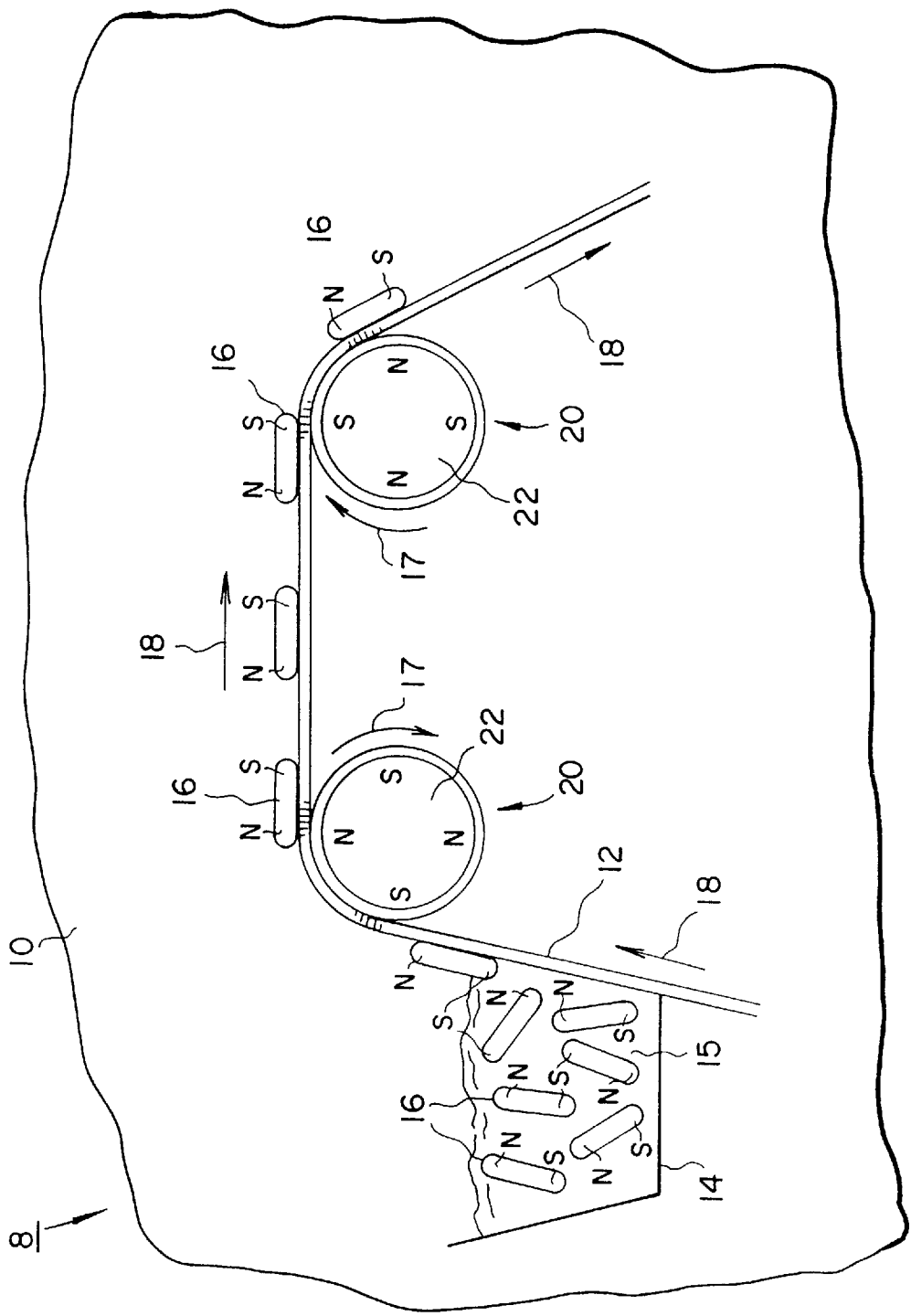

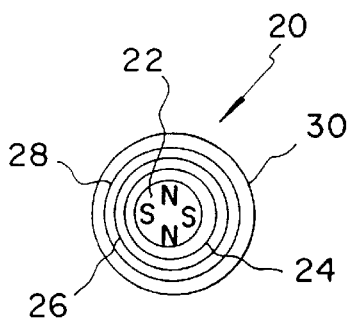
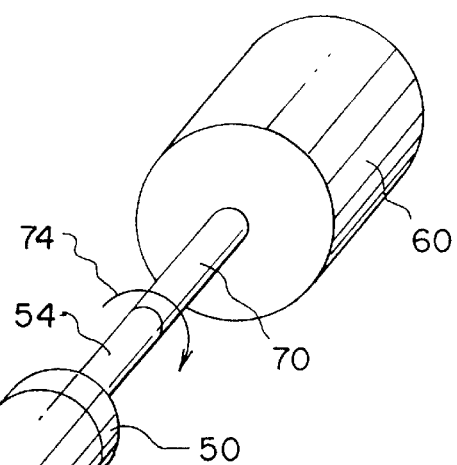
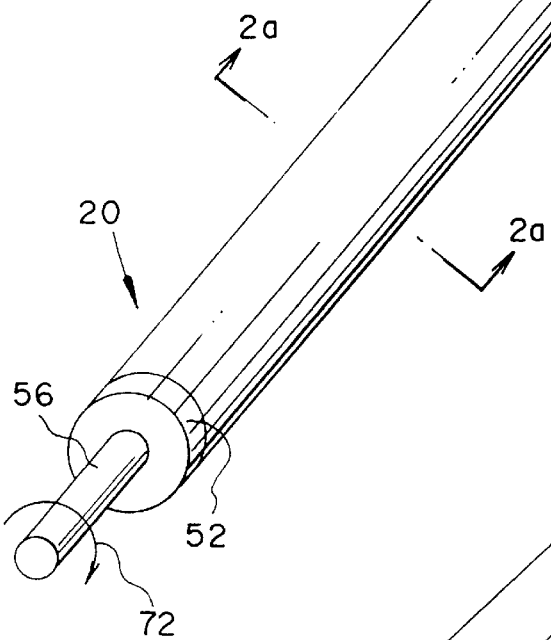
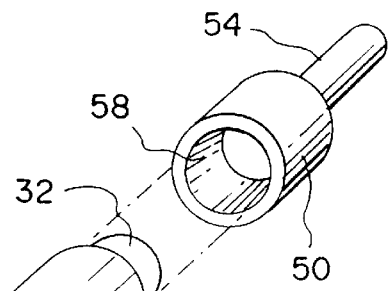
Fig. 2b
Fig. 2a
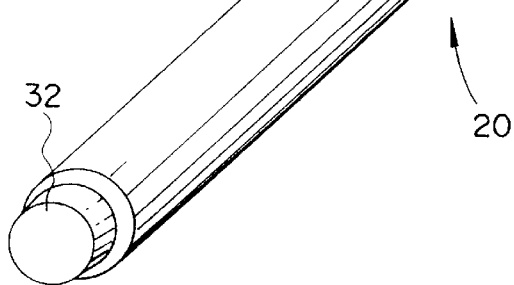
Fig. 3

METHOD FOR TRANSPORTING MAGNETIC OBJECTS

FIELD OF THE INVENTION

The invention relates to the transportation of magnetic parts and materials, more particularly, the invention concerns a method for transporting magnetic objects on a ferromagnetic web.

BACKGROUND OF THE INVENTION

Transport systems are used extensively in manufacturing processes to transport objects, more specifically, ferromagnetic objects, from one station to the next station. In numerous manufacturing processes, the transport system is exposed to abrasive or corrosive environments. For instance, in electroplating, painting and encapsulation of magnets pretreatment of the magnets such as cleaning, etching of the surfaces of these objects employing chemicals and abrasive particles is undertaken. It is imperative that during these pretreatment processes the magnetic transport system is not damaged by corrosion as well as by wear and abrasion encountered during the pretreatment of the magnets. Such transport system degrades when they are exposed to harsh chemical manufacturing environment. Furthermore, components of these transport systems must be wear and abrasion resistant so that the transported objects are not damaged during their use. Therefore, there is a need to design and manufacture a novel transport system which can effectively transport ferromagnetic components without damage either to the transport system or to the components being transported. The subject of this disclosure is a wear, abrasion and corrosion resistant magnetic transport rollers and ferromagnetic transport webs for use in a harsh and corrosive manufacturing environment.

The invention discloses a method for transporting magnetic objects using a magnetic transport system that can effectively transport the magnetic objects through corrosive environments without damage either to the transport system or to the objects being transported.

SUMMARY OF THE INVENTION

It is, therefore, an object of the invention to provide a method for transporting magnetic materials in a corrosive environment.

It is another object of the invention to provide a method of transport which uses wear and abrasion resistant components.

Yet another object of the invention is to provide a method that employs a magnetic transport system that utilizes magnetic coupling between a magnetic roller and a ferromagnetic web for transporting magnetic materials and objects.

It is a feature of the invention that the method includes the step of providing a magnetic roller in rotating contact with a ferromagnetic web that has multiple layers including a corrosion resistant layer and a wear and abrasion resistant layer surrounding a magnetic core.

To solve one or more of the problems above, there is provided a magnetic transport system having a frame and at least one transport roller mounted to the frame. The transport roller has a magnetic core and a first bonding layer, at least partially surrounds and is bonded to the core. Further, a first layer, comprising a corrosion resistant material, at least partially surrounds and is bonded to the first bonding layer of the roller. A second bonding layer is provided that at least partially surrounds and is bonded to the first layer. A second layer, comprising a wear and abrasion resistant material, at least partially surrounds and is bonded to the second bonding layer. Moreover, a web comprising a ferromagnetic material for magnetically adhering to the roller, is arranged for movement along the transport roller. At least a portion of the web is in rotating contact and is magnetically coupled to the roller. A drive means is provided for rotating the transport roller so that the web moves along the roller under the influence of a magnetic couple.

It is, therefore, an advantageous effect of the present invention that materials can be transported in a corrosive environment without degradation of the transport system. It is a further advantage of the invention that the transport system does not impart undesirable wear or abrasion to the materials being transported. Moreover, it is a further advantage of the invention that materials can be transported in a variety of orientations without the concerns for adverse gravitational effects.

BRIEF DESCRIPTION OF THE DRAWINGS

The above mentioned and other objects, features and advantages of the invention and the manner of attaining them will become more apparent and the invention itself will be better understood by reference to the following description of an embodiment of the invention taken in conjunction with the accompanying drawings, wherein:

FIG. 1 is a schematic view of the web transport system of the present invention;

FIG. 2a is a perspective view of the transport roller with an attached motor drive;

FIG. 2b is a cross-sectional view taken along line 2a—2a of FIG. 2a;

FIG. 3 is perspective view of the magnetic roller and end shaft member of the invention;

FIG. 4a is a perspective view of the web of the present invention; and, FIG. 4b is a cross-sectional view taken along line 4a—4a of FIG. 4a.

DETAILED DESCRIPTION OF THE INVENTION

Figure 4A:
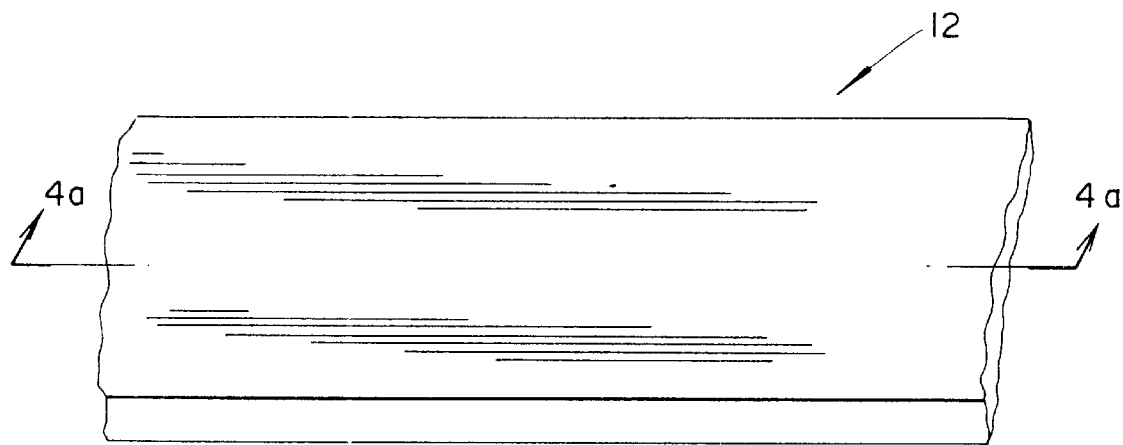

Referring to FIG. 1, a schematic view is shown of a magnetic transport system 8 of the present invention. Broadly defined, transport system 8 includes a rigid frame 10 (preferably metal) and at least one transport roller 20 having a permanent magnet core 22 (described fully below) mounted for rotation in the frame 10. A ferromagnetic web 12 (described below) for transporting magnetic objects 16 is arranged for movement about transport rollers 20 between a reservoir 14 and other upstream stations (not shown) in proximity to transport system 8. Typical magnetic objects 16 transportable by the invention include, but are not limited to, permanent magnets, and any object containing permanent magnets.

As shown in FIG. 1, reservoir 14, preferably made from a rigid material, may have virtually any shape and size depending upon application. Generally, reservoir 14 may include an openable portion for accessing the interior portion 15. A solution (S') may be added into reservoir 14 with dispersed magnetic objects therein, such as colloidal size magnetic particulates, which require separation from the solution. In this instance, the solution (S') containing the particulates is exposed to the ferromagnetic web 12 moving along transport roller 20 which magnetically separates them from the solution and then transport them upstream of the transport system 8 for independent treatment. Moreover, reservoir 14 may include an etching solution, such as hydrochloric acid, nitric acid and sodium hydroxide, for chemically etching the objects prior to the objects 16 contacting and then being transported by the web 12.

Referring to FIGS. 2a, 2b and 3, transport roller 20, driven by a motor 60 (shown in FIG. 2a), includes a magnetic core 22 made from a permanent magnet material. The core 22 is polarized with a plurality of radially disposed surface poles (denoted by N & S in FIG. 2b) of alternating polarity around its circumference. The web 12, which is a ferromagnetic multilayer web, comprises a ferromagnetic base layer 76 (shown in FIG. 4b). The magnetically polarized objects 16 attract and adhere to the portion of web 12 that is in close proximity to the reservoir 14. The portion of the web 12 that is in contact with the rollers 20 is attracted to the rollers 20 due to the force of attraction between the permanent magnet cores 22 and the ferromagnetic base layer 76 of the web 12 (shown in FIG. 4b). Thus, when the motor 60 (shown in FIG. 2a) rotates the rollers 20 (as indicated by rotation arrows 17), the web 12 moves translationally by the transport rollers 20 (as indicated by arrows 18) and consequently transports the attached magnetically polarized objects 16. The magnetically polarized objects 16 can be removed from the web 12 at a desired location by use of an electromagnet (not shown) as is well known.

Referring to FIG. 2a, illustrated is a perspective, partially exploded view of the transport roller 20 with opposing end support members 50, 52. Extending from each end support member 50, 52 is a respective shaft 54, 56. Shafts 54, 56 are preferably shrunk fit onto a respective end support members 50, 52. Skilled artisans will appreciate that shafts 54, 56 may also, for instance, be welded or bolted onto end support members 50, 52. Roller 20 is attached to a motor 60 operably connected to rotor shaft 70 which is coupled at one of the end support members 50, 52 via one of shafts 54, 56 for rotatably driving roller 20. The roller 20, driven by motor 60, can now rotate about its longitudinal axis in the direction indicated by arrows 72, 74.

End support members 50, 52 are preferably made from American Iron and Steel Institute (AISI) 316 stainless steel which can be obtained from any one of several well known suppliers.

In the preferred embodiment of the invention, shafts 54, 56 are electroplated with Teflon™ impregnated nickel so as to reduce the coefficient of friction.

Referring to FIG. 2b, roller 20 is illustrated in the cross sectional view of FIG. 2a. Roller 20, as indicated above, comprises a magnetic core 22. Magnetic core 22 is made preferably from a non rare-earth permanent magnet material such as aluminum-nickel-cobalt, barium-ferrite, copper-nickel-iron alloy, iron-cobalt-molybdenum alloy. Most preferred of the non rare-earth materials is aluminum-nickel-cobalt. In another embodiment of the invention, magnetic core 22 may be made of a rare-earth material such as neodymium-iron-boron, or samarium cobalt. In this instance, the most preferred material is neodymium-iron-boron manufactured by Magnaquench, Inc., Ind.

Referring again to FIG. 2b, in addition to magnetic core 22, roller 20 comprises first and second layers 26, 30 surrounding the core 22. Layers 26, 30 are preferably coated onto the core 22 using the techniques described below. According to our preferred embodiment, a first bonding layer 24 is coated onto the core 22. First bonding layer 24 is preferably comprised of copper or copper based alloys, chromium, gold, silver and combinations thereof. Most preferred is copper and its alloys. Skilled artisans will appreciate that bonding layer 24 may be applied to core 22 by using any of several conventional techniques. We, however, prefer depositing the first bonding layer 24 onto core 22 using physical vapor deposition (PVD), chemical vapor deposition (CVD), or some electroless or electrolytic deposition process, each producing substantially the same result. Preferably, we deposited first bonding layer 24 onto core 22 using an electrolytic deposition process. In the preferred embodiment, first bonding layer 24 has a thickness in the range of about 50 to 200 Angstroms, preferably 100 Angstroms.

Referring once again to FIG. 2b, after the first bonding layer 24 is bonded to core 22, a first layer 26 comprising a corrosion resistant material, is coated onto the first bonding layer 24. First layer 26 comprises preferably a coating of electroplated nickel or electroless nickel. The preferred method for depositing the first layer 26 of corrosion resistant material onto first bonding layer 24 is electroless plating. The first bonding layer 24 functions to enhance the adhesion of the first layer 26 of corrosion resistant material to the core 22. Preferably, first layer 26 has a thickness between 0.1 mil and 1 mil, most preferred being 0.5 mil.

According to FIG. 2b, a second bonding layer 28 is coated onto first layer 26. Second bonding layer comprises alloys of nickel-aluminum, nickel-chromium, cobalt-chromium-aluminum or combinations thereof. While numerous techniques may be used to deposit the second bonding layer 28, we prefer using a PVD or a plasma spraying method. Preferably, second bonding layer 28 has a thickness in the range of about 1,000 to 10,000 Angstroms, most preferred being 5,000 Angstroms.

Still referring to FIG. 2b, a second layer 30 comprising a wear and abrasion resistant material, is coated onto the second bonding layer 28. The second bonding layer 28 enhances the adhesion and minimizes the porosity of the second layer 30 by sealing pores (not shown) in the second layer 30. The preferred method for coating the second layer 30 onto the second bonding layer 28 is by dipping the roller 20 in solutions of polyurethane or acrylic. Alternatively, the second layer 30 may be spin or dip coated onto the second bonding layer 28 of roller 20 in a solution of sol-gel comprising silicon dioxide or alumina. Yet another acceptable technique for coating the second layer 30 onto the second bonding layer 28 is thermal or plasma spraying with a wear and abrasion resistant material such as chromium oxide, zirconium oxide, aluminum oxide, or composites of zirconia-alumina, or a combination thereof.

Referring to FIGS. 2a and 3, a perspective view is shown of the roller 20 having similarly tapered ends 32 and an end support member 50 mounted on either of the tapered ends 32. End support member 50 has an opening 58 for receiving the tapered end 32 of roller 20. Preferably, end support member 50 is fixedly attached to a tapered end 32 of roller 20 by shrink fitting or alternatively by press fitting.

Referring to FIG. 4a, a perspective is shown of the flexible magnetic multilayer web 12 which conveys magnetic objects 16. According to FIG. 4b, web 12 is shown in cross-sectional view taken along line 4a—4a of FIG. 4a. The web 12 comprises a ferromagnetic base layer 76. The ferromagnetic base layer 76 is flexible and comprises soft-magnetic particles embedded in a binder. Specifically, soft ferrites of the general formula $MOFe_2O_3$, where M is a divalent metal such as Mg, Mn, Ni etc. are mixed in a binder system for manufacture of the base layer 76. The binder system essentially consists of organic materials such as cellulose acetate, Kevlar™ (manufactured by DuPont), nylon etc. The dispersion of the soft magnetic particles in the binder system is known in the art. The dispersed magnetic particles are formed into a web either by knife coating or by extrusion or by any suitable means known in the art such as tape casting.

In an alternate embodiment, the base layer 76 can also be formed on a flexible non-magnetic metal or alloy substrate such as austenitic stainless steel of 1 to 10 mil in thickness, Soft magnetic material can be plasma or thermally sprayed on the flexible substrate using a suitable bond layer known in the art. Deposition of soft magnetic materials can also be made on the flexible substrate through physical vapor deposition (PVD), or chemical vapor deposition (CVD).

Referring again to FIG. 4b, in addition to the ferromagnetic base layer 76, the web 12 comprises first and second web layers 86, 90 surrounding the ferromagnetic base layer 76. Web layers 88, 90 are preferably coated onto the ferromagnetic base layer 76 using the techniques described below. According to our preferred embodiment, a first web bonding layer 84 is coated onto the ferromagnetic base layer 76. The first web bonding layer 84 is preferably comprised of copper or copper based alloys, chromium, gold, silver and combinations thereof. Most preferred is copper and its alloys. Skilled artisans will appreciate that the first web bonding layer 84 may be applied to ferromagnetic base layer 76 by using any of several conventional techniques. We, however, prefer depositing the first web bonding layer 84 onto ferromagnetic base layer 76 using physical vapor deposition (PVD), chemical vapor deposition (CVD), or some electroless or electrolytic deposition process, each producing substantially the same result. Preferably, we deposited the first web bonding layer 84 onto the ferromagnetic base layer 76 using an electrolytic deposition process. In the preferred embodiment, first web bonding layer 84 has a thickness in the range of about 50 to 200 Angstroms, preferably 100 Angstroms.

Referring once again to FIG. 4b, after the first web bonding layer 84 is bonded to the ferromagnetic base layer 76, a first web layer 86 comprising a corrosion resistant material, is coated onto the first web bonding layer 84. The first web layer 86 comprises preferably a coating of electroplated nickel or electroless nickel. The preferred method for depositing the first web layer 86 of corrosion resistant material onto the first web bonding layer 84 is electroless plating. The first web bonding layer 84 functions to enhance the adhesion of the first web layer 86 of corrosion resistant material to the ferromagnetic base layer 76. Preferably, the first web layer 86 has a thickness between 0.1 mil and 1 mil, most preferred being 0.5 mil.

Figure 4B:
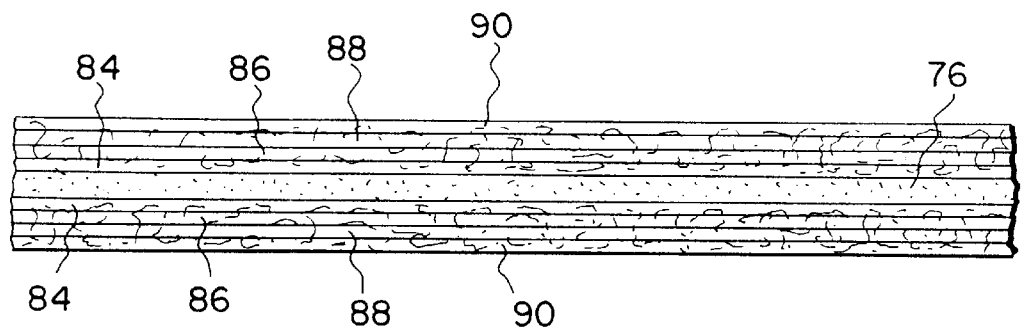

According to FIG. 4b, a second web bonding layer 88 is coated onto first web layer 86. The second web bonding layer 88 comprises alloys of nickel-aluminum, nickel-chromium, cobalt-chromium-aluminum or combinations thereof. While numerous techniques may be used to deposit the second web bonding layer 88, we prefer using a PVD or a plasma spraying method. Preferably, the second web bonding layer 88 has a thickness in the range of about 1,000 to 10,000 Angstroms, most preferred being 5,000 Angstroms.

Still referring to FIG. 4b, a second web layer 90 comprising a wear and abrasion resistant material, is coated onto the second web bonding layer 88. The second web bonding layer 88 enhances the adhesion and minimizes the porosity of the second web layer 90 by sealing pores (not shown) in the second web layer 90. The preferred method for coating the second web layer 90 onto the second web bonding layer 88 is by dipping the web 12 in solutions of polyurethane or acrylic. Alternatively, the second web layer 90 may be spin or dip coated onto the second bonding layer 88 of the web 12 in a solution of sol-gel comprising silicon dioxide or alumina. Yet another acceptable technique for coating the second web layer 90 onto the second web bonding layer 88 is thermal or plasma spraying with a wear and abrasion resistant material such as chromium oxide, zirconium oxide, aluminum oxide or composites of zirconia-alumina, or a combination thereof.

While the invention has been described with a certain degree of particularity, it is manifest that many changes may be made in the details of the construction and the arrangement of the components without departing from the spirit and scope of the disclosure. It is understood that the invention is not limited to the embodiments set forth herein for purposes of exemplification, but is to be limited only by the scope of the attached claims, including the full range of equivalency to which each element thereof is entitled.

PARTS LIST

8 . . . magnetic transport system
10 . . . frame
12 . . . web
14 . . . reservoir
15 . . . interior portion
16 . . . magnetically polarized components
17 . . . rotation arrows
18 . . . arrows
20 . . . roller
22 . . . core
24 . . . first bonding layer
26 . . . first layer
28 . . . second bonding layer
30 . . . second layer
32 . . . tapered end
50 . . . end support member
52 . . . end support member
54 . . . shaft
56 . . . shaft
58 . . . opening
60 . . . motor
70 . . . rotor shaft
72 . . . rotation arrow
74 . . . rotation arrow
76 . . . ferromagnetic base layer
84 . . . first web bonding layer
86 . . . first web layer
88 . . . second web bonding layer
90 . . . second web layer

What is claimed is:

1. A method for transporting magnetic objects, comprising the steps of:

providing a frame;

providing at least one transport roller mounted to said frame, said roller comprising a magnetic core; a first bonding layer at least partially surrounding and bonded to said core; a first layer at least partially surrounding and bonded to said first bonding layer, said first layer comprising a corrosion resistant material; a second bonding layer at least partially surrounding and bonded to said first layer; a second layer at least partially surrounding and bonded to said second bonding layer, said second layer comprising a wear and abrasion resistant material;

providing a web comprising a ferromagnetic material for movement about said transport roller;

providing means for rotating said transport roller so that said web moves along said roller under the influence of a magnetic coupling between said roller and said web;

providing a reservoir of permanent magnet objects for transport by said web;

placing said permanent magnet objects into close magnetic proximity of said web;

rotating said transport roller so as to transport said permanent magnet objects from said reservoir to an upstream station along said web; and, removing said objects from said web.

2. The method recited in claim 1, wherein said step of providing a reservoir includes the step of at least partially filling the reservoir with said objects.

3. The method recited in claim 2, wherein said step of providing a reservoir further includes the step of vibrating said reservoir prior to placing the objects onto said web.

4. The method recited in claim 1, wherein said step of providing a reservoir further includes the step of chemically etching said objects prior to the step of placing said objects onto said web.

5. The method recited in claim 1, wherein said step of providing a reservoir further includes the step of providing a reservoir containing a solution with magnetic particles dispersed therein for separating said particles from said solution.

* * * * *